United States Patent [19]

Smith

[11] 3,717,448
[45] Feb. 20, 1973

[54] APPARATUS FOR AND METHOD OF PROCESSING WET STRAND-LIKE MATERIAL

[75] Inventor: Roy E. Smith, Columbus, Ohio

[73] Assignee: Owens-Corning Fiberglas Corporation

[22] Filed: March 27, 1972

[21] Appl. No.: 238,252

Related U.S. Application Data

[63] Continuation-in-part of Ser. No. 40,024, May 25, 1970, abandoned.

[52] U.S. Cl.....................65/3, 117/126 GB, 118/63, 118/69
[51] Int. Cl..............................................C03c 25/02
[58] Field of Search........65/2, 3, 11 W; 117/126 GB; 118/61, 69, 65, 67, 63

[56] References Cited

UNITED STATES PATENTS

| 3,158,519 | 11/1964 | Shannon et al | 117/126 GB |
| 3,425,862 | 2/1969 | Eakins | 65/3 X |
| 3,428,518 | 2/1969 | Schafer | 117/126 GB |
| 3,494,753 | 2/1970 | Sears | 65/3 |
| 3,565,039 | 2/1971 | Remer | 118/61 X |
| 3,619,252 | 11/1971 | Roschler | 65/3 X |
| 3,620,701 | 11/1971 | Janefos et al | 65/3 |

Primary Examiner—Robert L. Lindsay, Jr.
Attorney—Ronald C. Hudgens

[57] ABSTRACT

Apparatus for and method of processing wet strand having a tendency to effect a coherence of the strands upon contact with each other including subjecting the advancing separated side-by-side wet strands to conditions promoting a drying of the strands to a non-coherent state on their way to a collection zone and accumulating the strands at the collection zone.

12 Claims, 13 Drawing Figures

APPARATUS FOR AND METHOD OF PROCESSING WET STRAND-LIKE MATERIAL

This is a continuation-in-part of copending application Ser. No. 40,024, filed May 25, 1970 now abandoned.

BACKGROUND OF THE INVENTION

It has been the practice to protect glass filaments in continuous glass filament forming operations by applying a sizing liquid or other protective liquid to individual glass filaments prior to combining them into a strand bundle or bundles for collection into a wound package of wet glass strand. While this practice of wet processing glass filaments in glass filament forming operations causes long subsequent drying steps, the very nature of glass filaments demands application of a protective liquid before combining them into a strand bundle. Unprotected glass filaments tend to abrade each other upon contact. Consequently, processes of forming continuous glass filaments must form a protective coating on the glass filaments before combining them into a strand.

Subsequent drying of wet wound strand packages is a long process that causes migration of solids in the sizing or coating in strand packages as liquid moves for evaporation at the periphery of packages. Such movement of the solids tends to concentrate these solids in the strand portions located near the periphery of the package. Because strands from these packages possess varying amounts of solids along their length, strand properties are not uniform along their length; accordingly, such strands are not wholly satisfactory.

Upon drying, wound packages of glass strand are ready for additional processing. The type of processing depends upon the end use of the strand, which is generally determined by such things as the size of the filament diameter and the number of filaments in a bundle. Glass strands suitable for textile application may pass through a twisting and plying operation. Glass strands suitable for use as a reinforcement for material such as plastics may be made into roving; subsequently, the roving may be chopped into short lengths. Each of these processes is an operation occuring after package drying. Each of the strand processing operations is time consuming and expensive. For example, in roving a number of creels hold the packages of dry strand and winding apparatus combines the strands and winds the combined strands into a wound package, i.e., a roving ball. Because the cohesive forces of the sizing adheres the individual filaments of a strand together, the filaments in the strands are somewhat held together. Accordingly, glass roving is a bundle of strands that are made up of glass filaments held together by sizing applied to the glass in the glass filament forming operation.

As one can appreciate, conventional processing including drying operations is slow and cumbersome. Even with these drawbacks the strand produce manufactured by prior methods is less than wholly satisfactory because migration of solids within a drying strand package provides a strand product that does not have a uniform amount of sizing solids along its length. Then too, when wet strand collected into a package is subsequently dried, the cohesive forces of the sizing tends to cohere adjacent strands together to cause strand breaks during subsequent processing.

Further, it has been necessary to have operators thread strands by hand into the slots of strand traversing devices employed on winding machines such as the winders used in glass filament forming operations. The slow hand threading process is not compatible with the high speed winding machines employing the traverse devices.

SUMMARY OF THE INVENTION

An object of the invention is improved apparatus for and method of processing filamentary strand-like units.

Another object of the invention is apparatus for and method of advancing towards a collection zone separated wet strands that have a tendency to effect a coherence between themselves upon contact with each other and subjecting them to conditions promoting drying of the strands to a noncoherent before accumulating them at the collection zone.

Another object of the invention is apparatus for and method of advancing towards a collection zone separated wet strands that have a tendency to effect a coherence between themselves upon contact with each other and subjecting them to conditions promoting drying of the strands to a noncoherent condition before gathering the strand together.

Another object of the invention is apparatus and method of collecting dry glass strand as a wound package in a glass fiber forming operation.

Still another object of the invention is to collect a dry glass roving product as a wound package in a glass fiber forming operation.

Still another object of the invention is to process glass strand into a roving product by advancing separated wet glass strands into a drying zone and totally drying the glass strands prior to combining them.

Other objects and advantages of the invention will become apparent as the invention is described hereinafter in more detail with reference made to the accompanying drawings.

DESCRIPTION OF THE PREFERRED EMBODIMENTS

While the apparatus and method of the invention are particularly valuable in processes of forming filaments from heat softened fiber forming mineral material such as molten glass where apparatus attenuates individual molten glass streams into glass filaments, combines individual glass filaments into a strand bundle and collects the strand as a wound package, one may use the apparatus and method to process other types of linear units such as monofilaments and multifilament linear strand-like units of other fiber forming materials, e.g., nylons, polyesters and the like. Accordingly, the use of glass strands and glass strand bundles in a glass filament forming operation is only an example to explain the operation of the invention; the invention has utility in other textile operations including processing other multifilament linear strand-like units such as yarns, cords and the like.

Figure 1:
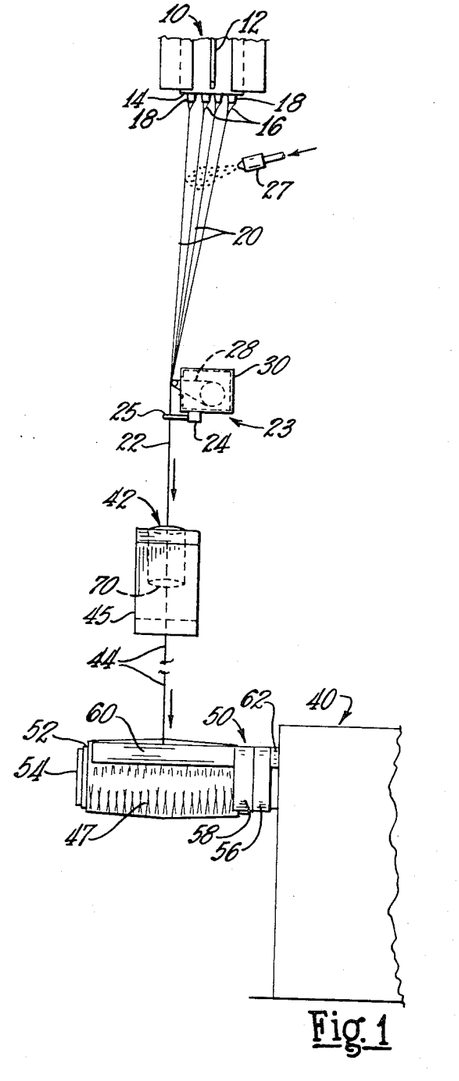
FIG. 1 is a front elevation view of apparatus operating according to the principles of the invention for forming and processing continuous glass filaments into a roving product collected as a package on a winder.
Figure 2:
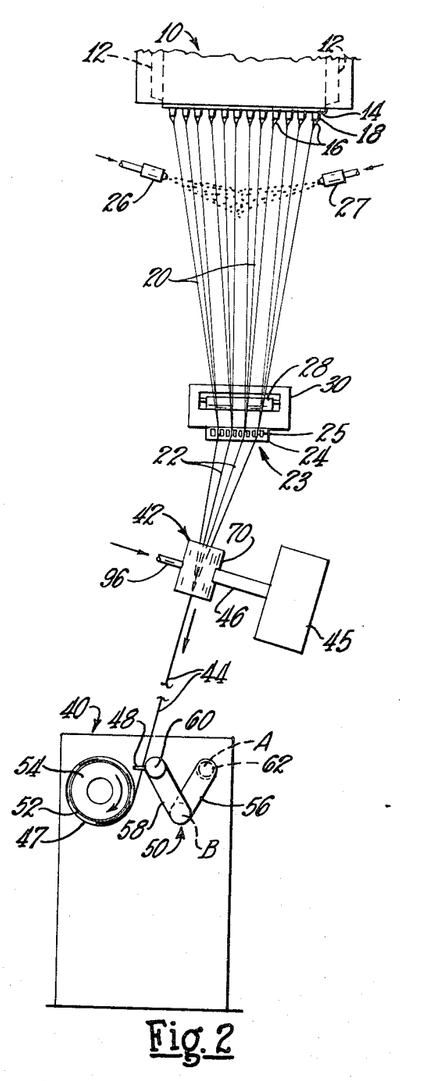
FIG. 2 is a side elevation view of the apparatus illustrated in FIG. 1.

FIGS. 1 and 2 show apparatus for producing a glass roving product in a glass filament forming operation. The apparatus processes continuous glass filaments from molten glass streams and combines the continuous glass filaments wet with sizing liquid into a selected number of filament bundles or strands prior to combining the strands into a strand bundle. Because the sizing on the strands tends to effect a coherence between the wet strands upon contact with each other and tends to increase such coherence as the strands dry, the apparatus of the invention subjects the separated advancing glass strands to conditions promoting drying to a noncoherent state before gathering the strands together into a bundle of strands or roving for collection by a winder. As illustrated a container 10 holds a supply of molten glass. The container 10 may connect to a forehearth that supplies molten glass from a furnace or may connect to a means for supplying glass such as glass marbles that a melter or other means associated with the container 10 reduces to a molten condition. At the ends of the container 10 are terminals 12 that connect to a source of electrical energy to supply heat by conventional resistance heating to the molten glass held in the container 10 to maintain such molten glass at proper fiber forming temperatures and viscosities. The container 10 has a bottom 14 with a plurality of orifices or passageways for delivering streams 16 of molten glass from the container 10. As shown, the openings comprise a plurality of depending orificed projections or tubular members 18.

The molten glass streams 16 are attenuated into individual continuous glass filaments 20 that are combined into a selected number of bundles or strands 22 by a comb-like gather shoe 23 located below the container 10. As shown the gathering shoe 23 combines the filaments 20 into four strands 22 and includes a base support 24 and fingers 25 that project from the support 24. In forming each of the bundles of filaments or strands 22, a selected number of filaments 20 advance along converging paths to merge and to turn on the lengthwise surface of one of the fingers 25. In the embodiment of FIGS. 1 and 2 the strands 22 advance from the fingers 25 along converging paths extending generally from 10 to 30 degrees from the vertical.

While the filaments 20 may be protected only by application of water to them, it is desirable in most instances to apply a conventional sizing liquid or other coating liquid to the filaments 20. The arrangement shown in FIGS. 1 and 2 locates nozzles 26 and 27 near the bottom 14. The nozzles spray water onto the newly formed filaments 20 before the gathering shoe 23 combines the filaments 20 into the individual strands 22.

An applicator 28 supported within a housing 30 just above the comb-like gathering unit 23 applies a sizing liquid or other coating liquid to the advancing individual filaments 20. The applicator 28 may be any suitable means known to the art such as an endless belt that moves to pass through sizing liquid or other coating liquid held in the housing 30. As the individual filaments 20 advance to pass across the surface of the applicator 28, some of the liquid on the applicator transfers to them. Consequently the filaments 20 advancing to the shoe 23 are wet and have a tendency to effect a coherence between themselves upon contact. The tendency to effect such coherence increases as the filaments dry.

While the arrangement normally applies a sizing liquid to the filaments 20, it is possible to apply special liquid coating compositions to the advancing filaments. For example, one could apply an aqueous dispersion of a resorcinol formaldehyde resin.

After the shoe 23 combines the wet filaments 20 into the individual strands 22, the arrangement of FIGS. 1 and 2 subjects the advancing separated wet glass strands 22 to conditions promoting drying of the strands to a noncoherent condition prior to gathering them into a strand bundle for collection on a winder 40. Normally, a drying means completely dries the strands 22 before the apparatus combines the strands 22 into a bundle of strands. As shown, the wet and separated glass strands 22 advance to a strand drying unit that may be a high frequency drying means such as a microwave unit 42 operating to dry the strands 22 before the apparatus gathers them into a bundle of dry strands or roving 44. As more clearly seen in FIGS. 2 and 3, the unit 42 gathers the strands 22 at its exit outlet into a continuous linear bundle 44 of completely dry strands 22 for accumulation on the winder 40. The unit 42 receives its microwave energy from a microwave generator such as a magnetron 45 through a wave guide 46.

The strand bundle or roving 44 of dry strands 22 collects as a wound package 47 on the winding machine 40, which normally advances the strands 22 (strand bundle 44) at a linear speed of from 5,000 to 15,000 feet-per-minute. A traversing member 48 mounted for reciprocating motion on a support 50 of the winder 40 moves the advancing bundle 44 back and forth lengthwise of the package 47 as the bundle 44 winds on a collector such as a tube 52 telescoped over a spindle or collet 54 that is driven in rotation on the winder. Because each strand 22 winds on the package 47 as part of a common bundle 44, the length of each of the strands of the strand bundle 44 in the package 47 tend to be generally equal.

The support 50 is an assembly that provides substantially infinite adjustment for the traverse 48 and that includes a rearward unit 56, a forward unit 58 and a cam housing 60. Each of the units 56 and 58 moves about a separate axis spaced from the collet 54 and package 47.

The rearward unit 56 pivotally mounts on a support tube 62 extending from within the winder 40. Reference letter A in FIG. 2 indicates the axis about which the rearward unit 56 moves for proper positioning. The forward unit 58 mounts on the forward portion of the rearward unit 56 and moves about an axis indicated by the reference letter B in FIG. 2. The axes A and B are in spaced relation and extend in parallel directions lengthwise of the collet 54.

The cam housing 60 is on the forward portion of the forward unit 58 and extends in a direction substantially parallel to the axis of rotation of the collet or spindle 54. The traverse 48 slideably mounts on the cam housing 60. A motor and drive arrangement within the winder 40 and support 50 reciprocates the traverse 48 lengthwise of the collecting package 47.

The traversing arrangement of the winder 40 moves the advancing bundle 44 back and forth lengthwise of the collecting tube 52 to distribute the advancing bundle 44 as the winder 40 builds the package 47. The motion given to the linear group 44 by the traversing arrangement is lateral of the bundle's direction of travel to the package 47 and is a combination of movement provided to the bundle 44 by both rapidly reciprocating the traverse 48 and more slowly reciprocating the support 50. As shown, the winder 40 reciprocates the support 50 by moving the support tube 62 back and forth along the axis A.

The winder 40 is an example of collection means useful in packaging the roving 44. It may be advantageous to use a winder such as disclosed in U.S. Pat. No. 3,367,587, such winder forming a cylindrical wound package. Moreover, one may use other collection means for accumulating the roving 44.

Figure 3:
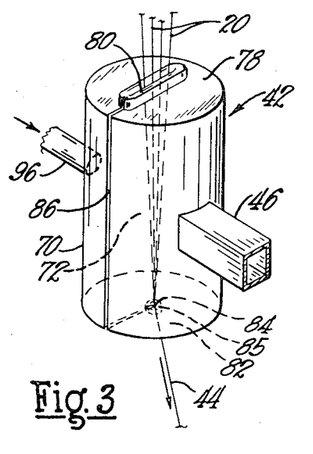
FIG. 3 is a perspective view of the microwave drying unit shown in FIGS. 1 and 2.
Figure 4:
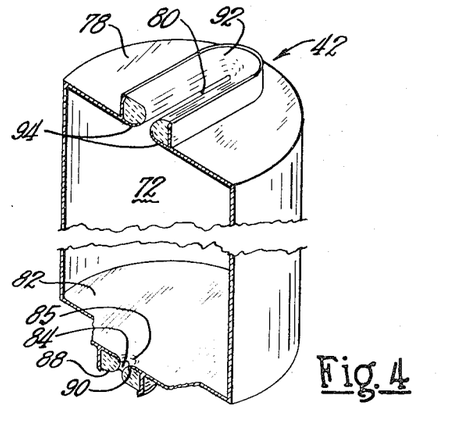
FIG. 4 is a perspective view in section of the microwave drying unit shown in FIGS. 1-3.

FIGS. 3 and 4 show enlarged views of the microwave unit 42. As shown, the unit 42 is a tubular housing 70 that is made of electrically conductive material and that is closed at both ends to provide a cylindrical resonant cavity 72 excited by the magnetron 45 through the wave guide 46. The tubular housing 70 has a closed entrance end 78 with a strand entrance slot 80 of sufficient size to admit the wet and spaced apart strands 22, which are advancing along converging paths, into the resonant cavity 72. At the closed exit end 82 of the tubular housing 70 is a strand exit slot 84 smaller than that the opening 80. The closed end 85 of the exit slot 84 gathers the dried strands 22 into the larger strand bundle 44. The housing 70 has a strand lacing slot 86 communicating with the slots 80 and 84 and the resonant cavity 72. The slot 86 extends axially in the side wall of the tubular housing 70 and partially across the ends 78 and 82 in alignment with the slots 80 and 84. The width of the lacing slot is shown to be the same width as the entrance slot 80 and exit slot 84. An operator can swiftly position the strands 22 for travel through the unit 42 by introducing the strands into the slots 80 and 81 through the lacing slot 86.

The position of the closed end 85 of the exit slot 84 presents a surface that pushes strands 22 closer to the surface into the strands further away from the surface. As shown, the closed end 85 is on the longitudinal axis of the housing 70. Such a position locates the advancing converging strands more centrally in the resonant cavity in addition to gathering the strands.

Because the strands 22 travel over the surface of the closed end 85 of the exit slot 84, the microwave unit 42 uses an insert 88 to assist in defining the surface of the exit opening 84. This arrangement is more clearly seen in FIG. 4. The insert provides the exit opening 84 with a smooth rounded surface that does not abrade the glass filaments traveling across it. Because portions 90 in the end 82 conform to the body of the insert 88, only the rounded surface of the insert 88 defining the narrowest portion of the exit slot 84 exposes itself to the resonant cavity. Accordingly, the material of the exit end 82 effectively shields the cavity 72 from the material of the insert 88.

As FIG. 4 shows, an insert 92 generally defines the entrance slot 80 with a rounded surface. Like the exit opening 84, portions 94 of the end 78 conform to the insert 92 to shield the resonant cavity from the material of the insert 92.

While the inserts 88 and 92 are normally made of nonelectrically conducting material compatible with glass such as micarta or a suitable ceramic, it is possible to use electrically conducting material, e.g. brass and graphite.

While it is possible to use microwave drying units operating in higher modes, the microwave arrangement of FIGS. 1–4 normally operates the cylindrical resonant cavity 72 in its fundamental mode to couple microwave energy into the liquid on the strands 22. More specifically, the apparatus operates in the $TM_{010}$ mode where the electric field components or lines extend in a direction parallel to the longitudinal axis of the resonant cavity and where the electrical field increases from substantially zero along the internal wall surface of the tubular housing 70 to a maximum along the longitudinal axis of the cavity 72. The increase in electrical field intensity is a curved line function providing a substantially higher electrical field intensity in the central region of the cavity 72 than the outer regions of the cavity; the transverse electrical field intensity profile is uniform throughout the length of the cavity 72. According to field orientation in the $TM_{010}$ mode in a cylindrical resonant cavity, the magnetic field orients itself transverse of the cavity 72. Magnetic field components or lines extend circumferentially about the cavity's longitudinal axis. The magnetic field lines, in any one transverse plane, are arranged in concentric circles that are centered on the longitudinal axis of the cavity 72. The intensity of the magnetic field increases from substantially zero at the longitudinal axis of the cavity to a maximum at the interior wall surface of the tubular housing 70.

When using most sizing liquids and other coatings, it is useful to operate the microwave heating unit 42 generally in a range of from 2,400 to 5,000 megacycles to remove liquid from traveling strands advancing at a linear strand speed of from 5,000 to 15,000 feet-per-minute. One can vary frequencies and speeds as necessary under differing conditions and different coatings.

A suitable arrangement supplies air to the resonant cavity 72. As shown, a source of air under appropriate pressure connects at one end to a tube 96, the other end of the tube 86 communicates with the resonant cavity 72. The air purges the resonant cavity 72 to insure that the cavity does not become saturated with moisture; moreover, because power dissipated in the unit 42 generates heat in the walls of the tubular housing 70, the moving air cools the interior surfaces of the tubular housing 70. It may be useful at times to supply air to the resonant cavity 72 through the wave guide 47 together with the microwave energy.

Figure 5:
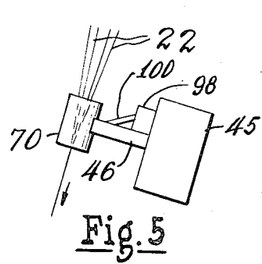
FIG. 5 is a side elevation view of a modified microwave drying unit for use with the apparatus shown in FIGS. 1-4.

It is advantageous to supply heated air to the resonant cavity 72. FIG. 5 shows the strand drying apparatus of FIGS. 1–4 modified to move heated air to the cavity 72 through the wave guide 46 together with the microwave energy from the magnetron 45. The apparatus includes a heater and blower assembly 98 and a duct 100. The duct 100 connects the assembly 98 with the interior of the wave guide 46. One may also introduce heated air into the cavity 72 other ways, such as through the tube 96.

Air purging the resonant cavity 72 controls relative humidity in the cavity 72 and hence, controls the rate at which the air in the cavity 72 is able to absorb vapor, such as water vapor, given off by the liquid on the advancing strands 22 during drying in the cavity 72. Heated air is especially useful in controlling the relative humidity in the cavity 72. And generally speaking, heated air is more effective in controlling relative humidity under conditions of greater amounts of vapor release from the liquid on the strands 22. Hence, higher temperature air would usually be moved into the cavity 72 under conditions of greater liquid evaporation in the cavity 72 from the strands 22. Air heated at a temperature of about 120°F is normally adaquate; however, air temperatures as high as 250°F or higher may be useful.

The velocity of air moving into the cavity 72 should be low enough to keep the strand lines essentially undisturbed.

In operation, it is preferred to keep the relative humidity in the cavity 72 below 50 percent. But air purging the cavity 72 should keep the relative humidity in the cavity 72 at least sufficiently low to effect absorption of vapor by the air in the cavity at least at least at a rate equal to the rate of evaporation of liquid on the strands 22. Besides modifying the air temperature, one can vary the velocity of air supply to the cavity 72.

It is believed possible to use gases other than air to purge the resonant cavity 72. For example the use of an inert gas such as nitrogen is believed useful where the coating material, e.g. a polymeric coating material, on strands is sensitive to air during drying.

While the microwave arrangement of FIGS. 1–4 uses a wave guide 46 to couple microwave energy from the magnetron 45 to the resonant cavity 72, one can use other means to transmit the microwave energy from the magnetron 45 to the unit 42. For example, one can employ a co-axial cable with a loop coupling arrangement.

In usual operation the microwave unit 42 completely dries the strands 22 prior to gathering them into the strand bundle 44. In the arrangement shown the wet strands 22 advance along converging paths into the tubular housing 70 through the strand entrance opening 80. The side-by-side strands 22 advance lengthwise through the tubular housing 70 in the higher intensity electrical field zone located centrally in the region around the longitudinal axis of the cylindrical resonant cavity 72. The energy in the electrical field heats the liquid on the advancing strands to vaporize it as the strands move toward the exit opening 84. The completely dry strands 22 come together as the strand bundle 44 at the exit opening 84.

Because the wet strands 22 have a liquid sizing or other coating liquid on them, the filaments 20 of the dried strands 22 are joined or adhered together by the solids of the sizing or coating. Consequently while the winder 40 collects a single strand bundle 44, the strands 22 of the bundle 44 are not joined together.

Although it is normally desirable to completely dry the strands 22 prior to combining them into a bundle 44, it is only necessary to dry the strands 22 to a non-cohesive condition with each other. Strands wet with water even have a tendency to effect a coherence or cohesiveness between themselves on contact. Accordingly, the strands 22 must be dried to a non-coherent condition prior to gathering them together.

Figure 6:
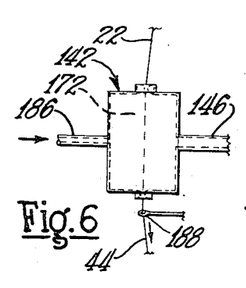
FIG. 6 is a side elevation view of another microwave drying unit suitable for use with the apparatus shown in FIGS. 1 and 2.
Figure 7:
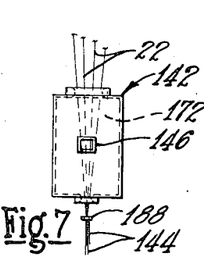
FIG. 7 is another side elevation view of the microwave drying unit shown in FIG. 6.

FIGS. 6 and 7 illustrate a modified strand drying and gathering arrangement using a microwave unit 142 having a cylindrical resonant cavity 172 excited by a magnetron through a wave guide 146. The wet strands 22 advance through the drying unit 142 along converging paths focusing on a point beyond (below as seen in FIGS. 5 and 6) the exit opening of the unit 142. As shown, a pigtail 188 spaced from the exit opening of the drying unit 142 gathers the strands 22 into the strand bundle 44. As in the case of the unit 42, a tube 186 supplies air under pressure to the resonant cavity 172.

As in the case of the microwave unit 42, unit 142 can employ a coaxial arrangement in place of the wave guide arrangement shown.

While the embodiments of the invention shown in FIGS. 1–7 use a microwave arrangement for drying strands, one can use other means for drying. For example, one may use other high frequency heating means such as arrangements employing infrared and dielectric energies. It is possible to use other heating means including thermal ovens, even where such ovens employ open flame. Electromagnetic wave energy in the microwave range is usually preferred in most cases.

Figure 8:
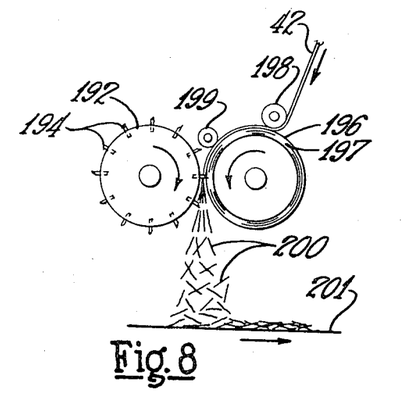
FIG. 8 is a somewhat diagrammatic front elevation view of chopping apparatus severing the glass roving product into short lengths. One may use the apparatus at a glass filament forming operation or locate the apparatus as a separate processing operation.

The linear strand bundle 44 of dried strands 22 is especially useful in processes employing short lengths of glass strands such as processes for manufacturing glass fiber reinforced plastics. FIG. 8 illustrates a chopper arrangement for severing the bundle 44 into short lengths. As shown, the chopper arrangement includes cooperating cutter roll 192 with blades 194 and a cot roll 196 having an outer surface 197 of resilient material such as a polyurethane composition. Suitable means drives the rolls 192 and 196 in rotation. The chopping arrangement cooperates to advance the linear bundle 44 into a cutting zone between the rolls 192 and 196. As shown, the apparatus advances the strand bundle 44 between the cot roll 196 and a first roll 198 in contact with the cot roll. Because the strand bundle 44 is dry or substantially dry, it is useful to use a second roll such as tuck roll 199 spaced from the first roll 198 towards the cutting zone. The tuck roll 199 cooperates to keep the strand bundle 44 against the resilient surface 197 of the cot roll 196. The blades 194 engage the advancing strand bundle 44 against the resilient surface 197 to sever the strand bundle 44 into short lengths. Because the strands 22 are noncoherent with respect to each other, they are individual within the strand bundle 44; consequently, the severed lengths of the strand bundle 44 separate themselves into short lengths 200 of strands 22 as they fall onto a moving surface 201. One may use the cutter arrangement in other processes, which may include advancing the short lengths from the rolls directly into a body of liquid plastic for mixing and subsequent processing into glass filament reinforced plastic articles.

One may either locate the chopping arrangement in glass fiber forming operation or in a separate operation accomplished after collection of the strand bundle 44 into the wound package 47. If one uses the chopping arrangement in a glass fiber forming operation, it may be useful to use the arrangement in place of the winder 40. Accordingly, such a modification to the apparatus of FIGS. 1 and 2 would produce short lengths of glass strand rather than forming a wound package 47. Alternately, the wound package 47 would supply the linear strand bundle 44 to the chopping arrangement in a separate and subsequent operation.

Figures 9, 10:
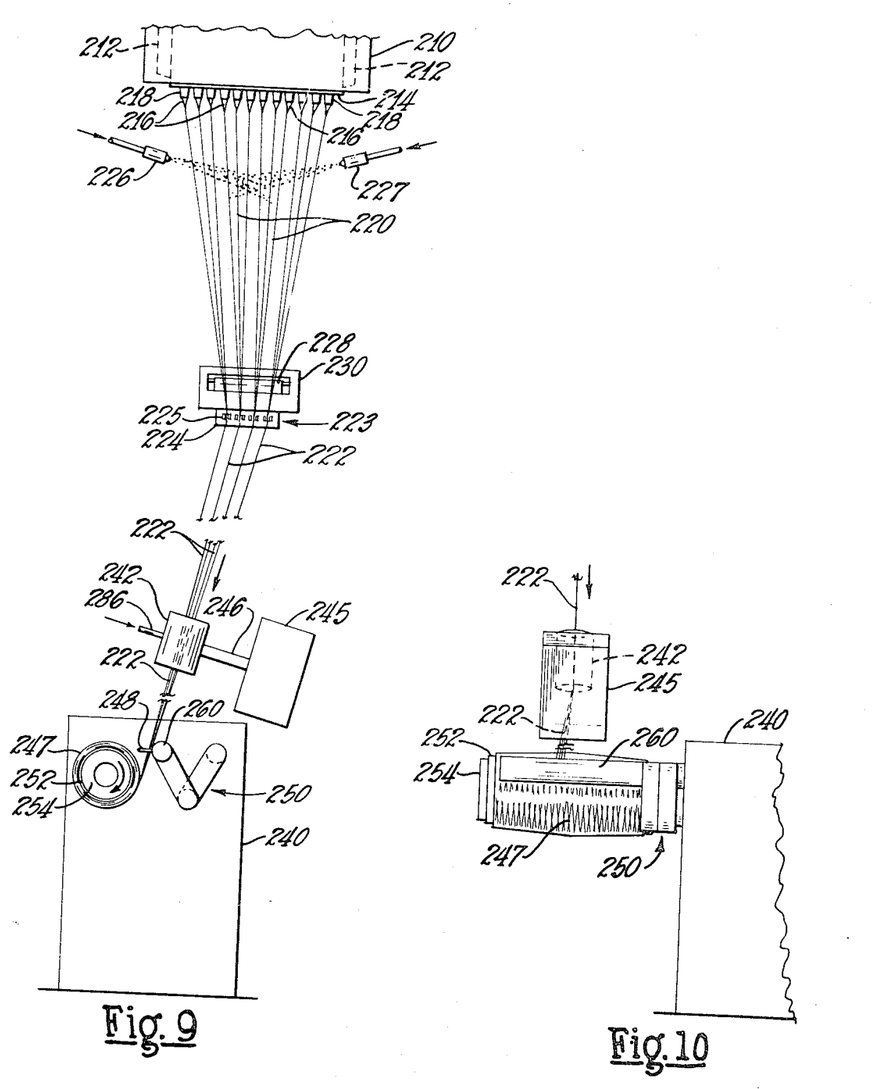
FIG. 9 is a side elevation view of modified apparatus operating according to the principles of the invention forming continuous glass filaments into individual glass strands and collecting these glass strands dry into a wound package on a winder.
FIG. 10 is a front elevation view of the drying and winding apparatus shown in FIG. 9.

FIGS. 9 and 10 illustrate another process of forming continuous glass filaments from molten glass that combines the continuous glass filaments wet with sizing liquid into a selected number of filament bundles or strands and dries the strands in separated relation prior to collecting them into a wound package. Unlike the apparatus shown in FIGS. 1 and 2 that gathers the strands 22, the apparatus of FIGS. 9 and 10 keeps the dried strands separated. As illustrated, a container 210 holds a supply of molten glass. The container 210 may connect to a forehearth that supplies molten glass from a furnace or may connect to a means for supplying glass such as glass marbles that a melter or other means associated with the container 210 reduces to a molten condition. At the ends of the container 210 are terminals 212 that connect to a source of electrical energy to supply heat by conventional resistance heating to the glass held in the container 210 to maintain such molten glass at proper fiber forming temperatures and viscosities. The container 210 has a bottom 214 with a plurality of orifices or passageways for delivering streams 216 of molten glass from the container 210. As shown, the openings comprise a plurality of depending orificed projections or tubular members 218.

The molten streams 216 are attenuated into individual continuous glass filaments 220 that are combined into a selected number of bundles or strands 222 by a comb-like gathering shoe 223 located below the container 210. Like the gathering shoe 23, the gathering shoe 223 combines the continuous glass filaments 220 into four strands 222 and includes a base support 224 and fingers 225. In forming each of the bundles of filaments or strands 222 a selected number of filaments 220 advance along converging paths to merge and to turn on the lengthwise surface of one of the fingers 225. The strands 222 as shown advance from the fingers 225 along somewhat converging paths generally from 10° to 30° from the vertical.

While the filaments 220 may be protected only by application of water to them, it is desirable in most instances, as in the case of the apparatus shown in FIGS. 1 and 2, to apply a conventional sizing liquid or other coating liquid to the filaments 220. The arrangement shown in FIG. 8 locates nozzles 226 and 227 near the bottom 214 to spray water onto the newly formed filaments 220 prior to combining them into the strands 222.

An applicator 228 supported within a housing 230 just about the comb-like gathering shoe 224 applies a sizing liquid or other coating liquid to the advancing individual filaments 220. The applicator 228 may be any suitable means known to the art such as an endless belt that moves to pass through the sizing liquid or other coating liquid held in the housing 230. As the individual filaments 220 advance across the surface of the applicator 228, some of the liquid on the applicator transfers to them.

The arrangement of FIGS. 9 and 10 normally operates to completely dry the individual strands 222 prior to collecting them on a winder 240 as a wound package 247. As shown, the apparatus advances the wet strands 222 in side-by-side separated relation through a high frequency driving means such as microwave unit 242 to dry them. The apparatus keeps the dried strands 222 in side-by-side separated relation as the strands advance to form the wound package 247 on the winder 240. Because the strands 222 advance through the drying unit 242 in spaced apart relationship, the unit 242 dries the strands 222 individually. As shown, the unit 242 receives its microwave energy from a microwave generator such as a magnetron 245 through a wave guide 246.

The side-by-side strands 222 collect as a wound package 247 on the winder 240, which normally advances the strands at a linear strand speed of from 5,000 to 15,000 feet-per-minute. A traversing member 248 mounted on a support 250 on the winder 240 engages the advancing strands 222 to move them back and forth lengthwise of the package 247 in separated side-by-side relationship as the strands wind on a collector such as a tube 252 telescoped over a spindle or collet 254 that is driven in rotation on the winder 240. The support 250 is like the support 50 shown in the apparatus of FIGS. 1 and 2. As in the case of the apparatus of FIGS. 1 and 2, the traversing member 248 slideably mounts in a slot 259 of a cam housing 260 forming a part of the support arrangement 250. The traversing member 248 connects in the housing 260 to a cam 261 that reciprocates it lengthwise of the collet 254.

Figure 11:
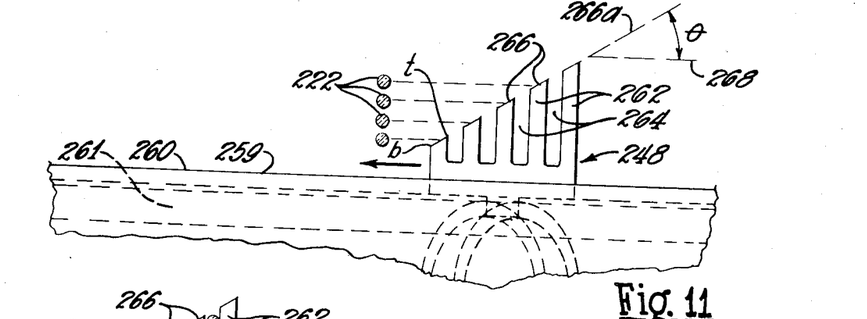
FIG. 11 is a plan view of a comb-like strand traversing member for a plurality of strands used with the apparatus shown in FIGS. 9 and 10 where the strand traverse member is out of engagement with separated strands advancing to the winder.
Figure 12:
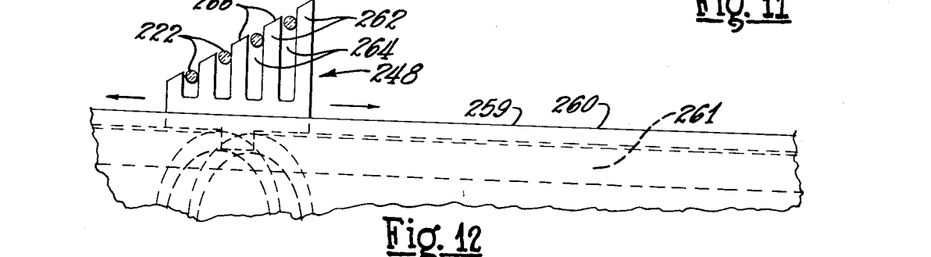
FIG. 12 is a plan view of the strand traversing member shown in FIG. 11 where the strands are held in divided relation between the projections of the member.
Figure 13:
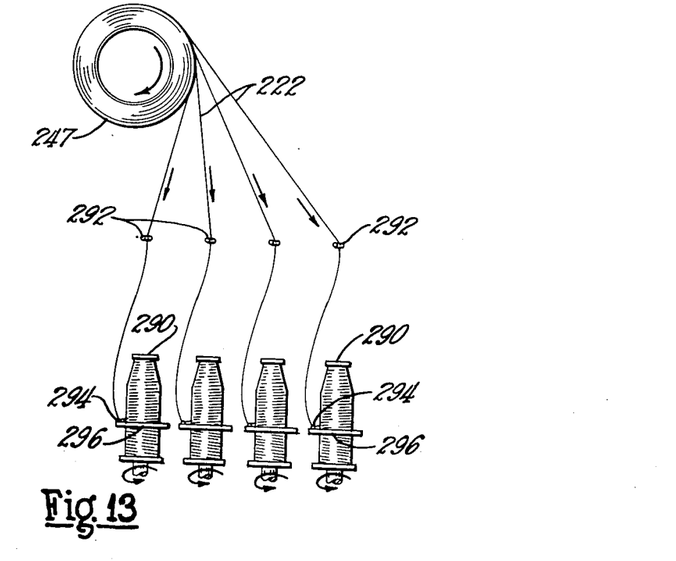
FIG. 13 is a somewhat diagrammatic front elevation view showing the wound package formed using the apparatus of FIGS. 9 and 10 to supply glass strand to several bobbins in a twisting operation.

The traverse 248 is a comb-like member with varying length projecting extensions or side-by-side fingers 262 forming slots 264 of different depths. The finers 262 extend in nonintersecting relationship with the strands 222 and terminate at their free end extremities (at the open end of the slots 264) with guide surfaces oriented in a direction oblique to the axes of projection of the fingers 262. Each of the guide surfaces has a base side $b$ and a termination or end side $t$. Guide surfaces 266 engage the strands to force them into the slots 264. As shown, the guide surfaces 266 terminate in a plane 266a oriented at an angle $\theta$ with the dashed line 268, which is parallel to the axis of rotation of the collector. Angle $\theta$ is normally from 15° to 50°.

Capture of strands in the slots 264 between the fingers 262 occurs through cooperation between strand and traversing member orientation and through design of the member 248. As indicated in FIGS. 11 and 12 the location of the apparatus of FIGS. 9 and 10 arranges the strands 222 to advance as a group in spaced apart side-by-side relation along given paths toward the collet 254 before the member 248 engages them. While it is not necessary to orient the non-traversing strands in a plane, planar orientation is normally used where the planar orientation is disposed in a nonparallel relationship with the axis of rotation of the collet 254. Accordingly, before the member 248 engages the strands 222, the strands 222 advance along given paths having separated points of tangency at the collector angularly spaced around the axis of rotation of the collector (tube 252 on the collet 254). FIG. 11 shows the strands 222 laterally of the traverse 248 in a first or non-traversing strand plane that is perpendicular or substantially perpendicular to the longitudinal axis of the collet 254 and essentially parallel to the slots 264 during times the strands 222 are out of engagement with the member 248. The cam 261 moves the member 248 laterally of the fingers 262 through the strand paths to engage and move the strands over the guide surfaces 266 to divide the strands between the fingers 262.

Because the fingers 262 extend to locate the guide surfaces 266 with their end sides $t$ no further than the base side $b$ of the adjacent finger guide surface located away from the strands (i.e. the direction away from movement of the traverse 248 to the strands 222), the strands freely move into engagement with the guide surfaces. Further, the terminating relationship between the fingers ensures confining surfaces holding the strands 222 between the fingers 262 during traversing movement of the member 248.

As the member 248 moves into contact with the strand 222 along paths indicated by the dashed lines in FIG. 11, the guide surfaces 266 individually engage the strands 222. As the guide surfaces 266 move through the strand paths, the strands 222 move over the guide surfaces 266 toward the end sides $t$. The surfaces 266 push or deflect the strand paths and accordingly, increase tension in the strands. As each strand 222 moves over an end side $t$, the force of increased tension along the strands moves the strands into the slots 264. Each of the strands thus becomes captured in a slot 264; thereafter the laterally moving member 248 reciprocates the captured strands 222 with it lengthwise of the collet 254.

While FIGS. 11 and 12 indicate guide surfaces 266 in their preferred form as flat, it is possible to use curved guide surfaces, e.g. convex or concave.

As indicated in FIG. 11, the fingers 262 orient the captured strands 222 in a plane extending in a direction oblique to the axes of projection of the fingers 262. As the strands 222 travel from the traverse 248 to enter the winding package 247, the strand orientation vis-a-vis the winding package changes. The strands enter the package in spaced apart relation in a plane following the surface of the package 247.

The length of the slots 264 extend in a direction away from the collector 252 for a distance greater than the movement of the strands 222 along the length of the slots during buildup of the package 247. Thus, the slots 264 are long enough to keep the strands 222 advancing to the collector therethrough from contacting their closed ends.

The strand drying unit 242 is like the unit 42 shown in FIGS. 1 through 7. As illustrated, the unit 242 provides a cylindrical resonant cavity 272 that receives it microwave energy from the magnetron 245 through the wave guide 246.

While it is possible to use higher modes in the operation of the microwave unit 242, the strand drying apparatus shown in FIGS. 9 and 10 normally operates the cylindrical resonant cavity 272 in its fundamental mode, $TM_{010}$, as explained in relation to the microwave unit 42.

A suitable arrangement supplies air to the resonant cavity 272. In FIGS. 9 and 10 a source of air under pressure connects with one end of a tube 286; the other end of tube 286 communicates with the resonant cavity 272. The air purges the cavity 272 as does the air passing through the cavity of the strand drying unit 42.

In usual operation the microwave unit 242 completely dries the strands 222 prior to their engagement with the traverse 248. The strands 222 advance lengthwise in the strand drying unit 242 through the high intensity electrical field located centrally in the region around the longitudinal axis of the cylindrical resonant cavity 272. The energy in the electric field heats the liquid on the strands to vaporize the liquid. The dry strands advance to the traversing member 248. Because the wet strands 222 have a liquid sizing or other coating liquid on them, the filaments 220 of the dried strands 222 are joined or adhered together by the solids of the sizing.

Although it is normally desirable to completely dry the strands 222 prior to their entry onto the package 247, it is only necessary to dry the strands 222 to a non-cohesive condition with respect to each other.

Like the strand drying arrangement of FIGS. 1–7, one can use other means for drying the strands. For example, one can use other high frequency heating means such as those using infrared and dielectric arrangements. Moreover, it is possible to use other heating means such as thermal ovens, even ovens employing open flame. Electromagnetic wave energy in the microwave range is usually preferred.

Because the traverse 248 maintains the advancing strands 222 in separated relationship, the dry strands 222 tend to keep their individual and separated relationship throughout the package 247, even at the ends of the package.

While the apparatus shown in FIGS. 9 and 10 can operate with other strand traversing members functioning to reciprocate the advancing strands 222 together in separated relationship, the member 248 is especially useful because of its automatic capture of a plurality of strands. The member can be used with apparatus other than the apparatus of FIGS. 9 and 10. Moreover, one can use strand traversing members like the member 248 in glass filament forming operations collecting wet glass strand into wound packages.

FIG. 9 shows the individual strands 222 from the package 247 supplying a number of bobbins 290 on a twist frame. A suitable means drives the package 247 in rotation to provide strands to the bobbins 290. Each of the strands 222 passes through a pigtail guide 292 to a traveler 294 on a ring rail 296 and thence onto a bobbin 290.

In both the apparatus of FIGS. 1 and 2 and 9 and 10 it is possible to use drying means in tandem. In the arrangement of FIGS. 1 and 2 strands would travel through multiple drying means prior to combining them into a strand bundle, i.e. roving 44. In such an arrangement one can apply more than one type of coating liquid to all of the advancing strands or multiple applications of the same coating liquid. Such drying means can be high frequency drying means using the same or different frequencies. One might also use drying combinations such as a unit employing microwave energy with a unit using dielectric energy.

In the apparatus of FIGS. 1 and 2 and 9 and 10 it is possible to reciprocate the collet of the winders and keep the traversing members stationary. Moreover, the drying units can be moved in conjunction with their traversing members to keep substantially fixed the length of the linear bundle(s) traveling from the outlet of drying units to the packages.

Further, it is possible to operate the apparatus of the invention to process linear filament bundles, such as continuous filament glass bundles, by subjecting wet separated filaments to conditions promoting their drying to a non-coherent state prior to gathering the filaments into a continuous linear filament bundle. As with the other arrangements, one can use high frequency drying means such as a microwave unit to effect drying of wet separate filaments, e.g. wet glass filaments.

I claim:

1. Apparatus for processing bundles of filaments comprising:
   a high frequency electrical drying oven;
   means for advancing separated wet bundles of filaments through the oven;
   means for providing high frequency electrical energy to the oven capable of drying the wet separated bundles during advancement therethrough;
   means for moving gas through the oven effective to remove moisture from the oven during strand drying by the high frequency electrical energy; and
   means for gathering the bundles upon advancement through the oven.

2. Apparatus of claim 1 wherein the means for providing high frequency electrical energy is a microwave energy means.

3. The method of producing and processing continuous filament glass comprising:
   supplying streams of molten glass;
   attenuating the streams of molten glass into individual continuous glass filaments advancing toward a collection zone;
   applying a liquid acting as sizing to the glass filaments;
   combining the wet glass filaments into at least two spaced apart bundles;
   drying the spaced apart bundles by subjecting them to a high frequency electrical energy field in a confined space;
   moving gas through the confined space effective to remove moisture therefrom; and
   gathering the dried bundles.

4. The method of producing and processing continuous filament glass comprising:
   supplying streams of molten glass;
   attenuating the streams of molten glass into continuous glass filaments advancing toward a winding station;
   applying a liquid to the glass filaments;
   combining the wet glass filaments into at least two spaced apart strands;
   advancing the separated strands through a microwave cavity to effect drying of the strands;
   moving air through the cavity effective to remove moisture from the cavity;
   combining the dried strands into a bundle; and
   collecting the bundle of dried strands as a wound package at the winding station.

5. The method of processing wet filamentary linear strand-like units having a tendency to effect a coherence of the units upon contact with each other comprising:
   advancing the wet filamentary linear strand-like units in separated relationship toward a collection zone;
   subjecting the advancing separated filamentary linear strand-like units to high frequency electrical energy in a confined space effective to dry such units to a noncoherent state;
   moving gas through the confined space effective to remove moisture therefrom;
   gathering the advancing filamentary linear strand-like units into a continuous linear bundle;
   severing the continuous linear bundle into short lengths, the short lengths of the linear bundle separating into individual short lengths of filamentary linear strand-like units; and
   accumulating the short lengths of filamentary linear strand-like units at the collection zone.

6. The method of claim 5 in which heated gas is moved through the confined space.

7. The method of processing wet multifilament linear strand-like units having a tendency to effect a cohesiveness of the units upon contact with each other comprising;
   advancing the wet multifilament linear strand-like units in separated relationship toward a winding station;
   drying the advancing separated multifilament linear strand-like units to a noncohesive condition by subjecting the units to microwave energy in a confined space;
   moving heated gas through the confined space effective to remove moisture therefrom; and
   collecting the multifilament linear strand-like units into a single wound package.

8. The method of processing wet multifilament linear strand-like units having a tendency to effect a cohesiveness of the units upon contact with each other comprising:
   advancing the wet multifilament linear strand-like units in separated relationship toward a winding station;

subjecting the advancing separated multifilament linear strand-like units to a microwave energy in a confined space to effect drying to a noncohesive condition;

moving gas through the confined space effective to remove moisture therefrom; and collecting the multifilament linear strand-like units into a single wound package where the strand-like units are in separated relationship in the package.

9. The method of producing glass strand comprising:

supplying streams of molten glass;

attenuating the streams of molten glass into continuous glass filaments traveling toward a winding station;

applying an aqueous coating material to the glass filaments;

combining the wet filaments into at least two glass strands;

advancing the glass strands in spaced apart side-by-side relationship through a microwave unit to effect drying of the strands;

moving air through the unit effective to remove moisture therefrom; and collecting the separated dried strands into a single wound package.

10. Apparatus for producing and processing continuous filament glass comprising:

means for supplying streams of molten glass for attenuation into continuous glass filaments;

means for applying aqueous liquid to the glass filaments;

means for gathering the wet filaments into at least two spaced apart wet strands;

a high frequency electrical drying unit capable of drying wet separated glass strands passed therethrough;

means for moving gas through the drying unit to remove moisture therefrom during strand drying by the unit;

means for gathering the strands subjected to high frequency energy into a continuous linear bundle; and a winder for collecting the bundle as a wound package.

11. The method of processing bundles of filaments comprising:

advancing separated wet bundles of filaments through a drying zone;

moving gas through the zone effective to promote drying of the bundles;

subjecting the separated bundles to high frequency electrical energy in the zone to effect drying of the bundles; and gathering the bundles thus dried.

12. The method of producing and processing glass strand comprising:

supplying streams of molten glass;

withdrawing continuous glass filaments from the streams;

applying a liquid to the advancing glass filaments;

combining the glass filaments into at least two spaced apart bundles;

advancing the wet bundles through a drying cavity;

subjecting the separated bundles in the cavity to high frequency electrical energy acting to dry the bundles;

moving gas through the cavity effective to remove moisture therefrom; and combining the bundles thus dried.

* * * * *